March 2, 1926.
R. G. THOMPSON ET AL
1,574,765
CARRIAGE FOR CARRIERS
Filed May 15, 1925
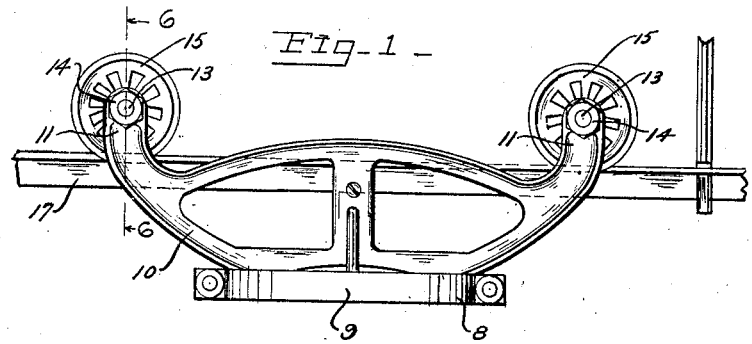
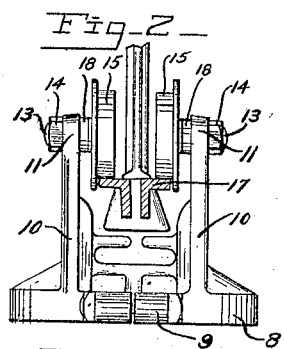
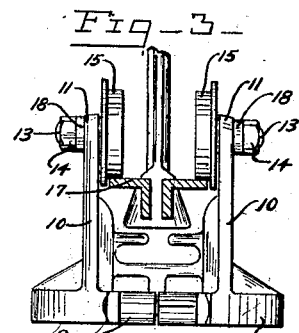
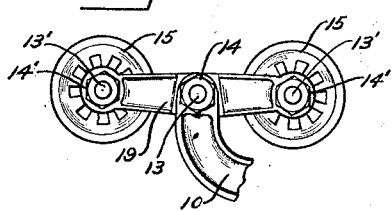
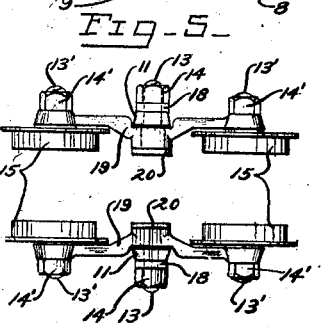
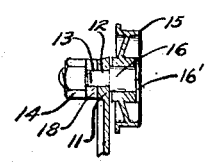
INVENTORS.
Russell G. Thompson
BY Elmer T. Abendroth
Morsell, Keeney & Morsell
ATTORNEYS.

Patented Mar. 2, 1926.

1,574,765

UNITED STATES PATENT OFFICE.

RUSSELL G. THOMPSON, OF JANESVILLE, AND ELMER T. ABENDROTH, OF DE PERE, WISCONSIN, ASSIGNORS TO HUDSON MANUFACTURING COMPANY, OF MINNEAPOLIS, MINNESOTA, A CORPORATION OF WISCONSIN.

CARRIAGE FOR CARRIERS.

Application filed May 15, 1925. Serial No. 30,572.

*To all whom it may concern:*

Be it known that we, RUSSELL G. THOMPSON and ELMER T. ABENDROTH, citizens of the United States, and residents, respectively, of Janesville, in the county of Rock and State of Wisconsin, and De Pere, in the county of Brown and State of Wisconsin, have invented new and useful Improvements in Carriages for Carriers, of which the following is a description, reference being had to the accompanying drawings, which are a part of this specification.

This invention relates to improvements in carrier carriages for use in barns and more particularly adapted for use with hay and litter carriers and the like.

It is one of the objects of the present invention to provide a carrier carriage adapted to ride on overhead tracks and so constructed that it may be adjusted to fit any width of track within certain limits.

A further object of the invention is to provide a carriage of the class described so constructed that its width may be varied by a very simple adjustment.

A further object of the invention is to provide a carriage of the class described which is of very simple construction, is strong and durable, and is well adapted for the purpose described.

With the above and other objects in view, the invention consists of the improved carriage for hay carriers and the like, and its parts and combinations as set forth in the claims, and all equivalents thereof.

In the accompanying drawing in which the same reference characters indicate the same parts in all of the views:

Fig. 1 is a side view of the improved carriage carried by an overhead track;

Fig. 2 is an end view thereof;

Fig. 3 is an end view showing the device adjusted to fit a track of greater width than the track shown in Fig. 2;

Fig. 4 is a fragmentary side view of a modified form of the invention;

Fig. 5 is a plan view thereof; and

Fig. 6 is a sectional view taken on line 6—6 of Fig. 1.

Referring now more particularly to the drawing, it will be seen that the numeral 3 indicates a carriage adapted for use in barns and the like, and constructed to permit the attachment of a hay or litter carrier to the portion 9 thereof.

The body of the carriage comprises a pair of spaced apart side frame portions 10, the ends of which terminate in upstanding bearing portions 11 having bores 12 therein. A threaded bolt 13 passes through each of said bores and the outer ends thereof carry nuts 14 to retain the bolts in position. Said bolts are shaped as shown in Fig. 6 and flanged wheels 15 are revolubly mounted on the enlarged portions 16 of said bolts, adjacent the inner faces of the bearing portions 11, said wheels being adapted to ride on tracks 17, as shown in Figs. 1, 2 and 3. The wheels 15 are held on the said bolts by the heads 16' thereof and said heads are preferably of hexagonal shape to engage with a wrench while securing the same to the side frame portions. The tracks are of the overhead class and are suspended from any convenient portion of a barn or building.

The particular feature of the invention resides in the means whereby the distance between the opposite wheels 15 may be varied to accommodate the carrier for use with different width tracks. In Fig. 2, one width of the track has been illustrated, while in Fig. 3 a wider track is shown, the carrier being adjusted accordingly. To accomplish the aforementioned end, washer members 18 are provided. When it is desired to adjust the carrier for a comparatively narrow form of track, the washers are interposed on the bolts 13 between the wheels and the inner faces of the bearing members 11, as shown in Fig. 2. To accommodate the device for a wider track, the washers are positioned on the bolts between the outer faces of the bearing members and the nuts, as shown in Figs. 3 and 6. Obviously different adjustments may be obtained by using different sizes of washers. Also, an intermediate adjustment can be made by positioning one washer adjacent the inner face of a bearing member and another washer adjacent the outer face of the opposite bearing member.

In Figs. 4 and 5, a slight modification of the invention has been shown. This form of the invention permits the attachment of pairs of wheels to each end of the side frame members and it is accomplished by the provision of arms 19 mounted on the bolts 13 which pass through the ends of the bearing members. The ends of the arms 19 are bored to receive bolts 13' which have revolubly mounted thereon the wheels 15, nuts 14' being provided for the ends of the bolts. The arms 19 are secured to the frame portions 10 by bolts 13 similar to the bolt shown in Fig. 6. From Fig. 5 it will be seen that the distance between opposite pairs of wheels can be varied by the positioning of washers 18 on the bolts 13. The washers can be carried between the outer faces of the portions 11 and nuts 14 or between the inner faces of the portions 11 and the outer faces of the arms 19. In this manner, adjustments are provided.

From the foregoing description, it will be seen that the improved carriage is of very simple and novel construction, can be adjusted to fit various widths of tracks, and is well adapted for the purpose set forth.

What we claim as our invention is:

1. A carriage of the class described, comprising a frame formed with a pair of spaced apart side members, wheels for said carriage, bolt means for connecting the wheels to the carriage, and washer members carried by said bolts and arranged for interchangeable mounting interiorly or exteriorly of said side frame members for varying the proximity of the wheels to the side frame members.

2. A carriage of the class described, comprising a frame formed with a pair of spaced apart side members, wheels for said carriage, bolt means for connecting the wheels to the carriage, and washer members carried by said bolts on either side of the side frame members for varying the proximity of the wheels to the side frame members.

3. A carriage of the class described, comprising a frame formed with a pair of spaced apart side members, wheels for said carriage, bolt means for connecting the wheels to the carriage, and washer members carried by said bolts on either side of the side frame members for varying the proximity of the wheels to the side frame members thereby permitting the utilization of the same length of bolt means for all adjustments of the wheels and frame with respect to each other.

4. A carriage of the class described, comprising a frame formed with a pair of spaced apart side members, wheels for said carriage, bolt means for connecting the wheels to each side portion of the carriage, the wheels of one side portion being disposed opposite the wheels of the other side portion, and washer members carried by said bolts, said washer members being interchangeable from one side of a side frame member to the other to vary the distance between opposite wheels.

5. A carriage of the class described for use with overhead tracks, comprising a frame formed with a pair of spaced apart side members terminating in upstanding bearing portions, wheels for said carriage and adapted to ride on an overhead track, bolt means passing through the bearing portions for connecting the wheels thereto, the wheels of one side portion being disposed opposite the wheels of the other side portion, and washer members carried by said bolts, said washer members being interchangeable from one side of a bearing portion to the other to vary the distance between opposite wheels to accommodate the carriage for use with various widthed tracks and also permitting the utilization of the same length of bolt means for all adjustments of the wheels.

6. A carriage of the class described, comprising a frame formed with a pair of spaced apart side members, bolt means passing through said side frame members, a wheel revolubly mounted on each bolt, and washer members adapted for interchangeable mounting on said bolts on either side of the side frame members for varying the proximity of the wheels to the side frame members.

7. A carriage of the class described for use with tracks, comprising a frame formed with a pair of spaced apart side members terminating in upstanding bearing portions, a bolt passing through each bearing portion, the bolts of one side member being disposed opposite the bolts of the other side member, a wheel revolubly mounted on each bolt adjacent the inner faces of the bearing portions, and washer members carried by said bolts, said washer members being interchangeable from a position between the outer face of the bearing member and the outer end of the bolt to a position between the wheel and the inner face of the bearing member to vary the distance between opposite wheels to accommodate the carriage for use with various widthed tracks and also permitting the utilization of the same length of bolt means for all adjustments of the wheels.

In testimony whereof, we affix our signatures.

RUSSELL G. THOMPSON.
ELMER T. ABENDROTH.